United States Patent
Horiike

(10) Patent No.: US 9,292,188 B2
(45) Date of Patent: Mar. 22, 2016

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Yoshiteru Horiike, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 120 days.

(21) Appl. No.: 13/682,902

(22) Filed: Nov. 21, 2012

(65) Prior Publication Data

US 2013/0139100 A1 May 30, 2013

(30) Foreign Application Priority Data

Nov. 30, 2011 (JP) ................. 2011-261840

(51) Int. Cl.
*G06F 3/0485* (2013.01)
*G06F 3/0482* (2013.01)

(52) U.S. Cl.
CPC ............ *G06F 3/0485* (2013.01); *G06F 3/0482* (2013.01)

(58) Field of Classification Search
USPC ......... 715/781, 784, 785, 799, 804, 808, 807, 715/810, 856, 863, 866; 345/156, 684, 685, 345/686
See application file for complete search history.

(56) References Cited

U.S. PATENT DOCUMENTS

| | | | |
|---|---|---|---|
| 6,288,718 B1* | 9/2001 | Laursen et al. | 715/800 |
| 8,683,378 B2* | 3/2014 | Bull et al. | 715/786 |
| 2003/0214679 A1* | 11/2003 | Ishikawa | 358/434 |
| 2004/0080541 A1* | 4/2004 | Saiga et al. | 345/805 |
| 2006/0084478 A1* | 4/2006 | Erlichmen | 455/566 |
| 2009/0100373 A1* | 4/2009 | Pixley et al. | 715/786 |
| 2010/0058240 A1* | 3/2010 | Bull et al. | 715/830 |
| 2011/0216094 A1* | 9/2011 | Murakami | G06F 3/0485 345/660 |
| 2011/0252362 A1* | 10/2011 | Cho et al. | 715/784 |
| 2012/0042278 A1* | 2/2012 | Vaisanen | 715/786 |
| 2012/0139935 A1* | 6/2012 | Miyasaka | G06F 3/0488 345/589 |
| 2012/0221969 A1* | 8/2012 | Sansen et al. | 715/784 |
| 2012/0272181 A1* | 10/2012 | Rogers et al. | 715/784 |

FOREIGN PATENT DOCUMENTS

JP 2010-152777 A 7/2010
WO 2010/146684 A1 12/2010

OTHER PUBLICATIONS

Hongzhi Song; "LensTree: Browsing and Navigating Large Hierarchical Information Structures," in Artificial Reality and Telexistence—Workshops, 2006. ICAT '06. 16th International Conference on , vol., no., pp. 682-687, Nov. 2006.*

* cited by examiner

*Primary Examiner* — Doon Chow
*Assistant Examiner* — Wendy Nicholas
(74) *Attorney, Agent, or Firm* — Canon USA, Inc. IP Division

(57) ABSTRACT

An information processing apparatus includes a display unit and a display control unit. The display unit displays a plurality of pieces of content. The display control unit causes, during scrolling the plurality of pieces of content displayed on the display unit, a display of content satisfying a specific condition in a form different from that of other content. The display control unit switches whether to display the content satisfying the specific condition in the form different from that of other content depending on whether scroll of the plurality of pieces of content is caused by a specific operation.

21 Claims, 13 Drawing Sheets

FIG.6

E-MAIL TRANSMISSION

[ADDRESS BOOK]

○ LIST OF ALL ADDRESSES ▶

| TYPE | NAME | ADDRESS |
|---|---|---|
| | KOSAKA | Kosaka@AAA.co.jp |
| | SAKAI | sakai@AAA.co.jp |
| | SASAKI | sasaki@AAA.co.jp |
| | SATO | sato@AAA.co.jp |
| | SATODA | satoda@AAA.co.jp |
| | SANADA | sanada@AAA.co.jp |
| | SHISHIDO | shishido@AAA.co.jp |

601

REGISTER/EDIT

SEARCH BY NAME

OK

NUMBER OF ADDRESSES: 0

ALL | A | KA | SA | TA | NA | HA | MA | YA... | A-Z | 0-9

✕ CANCEL

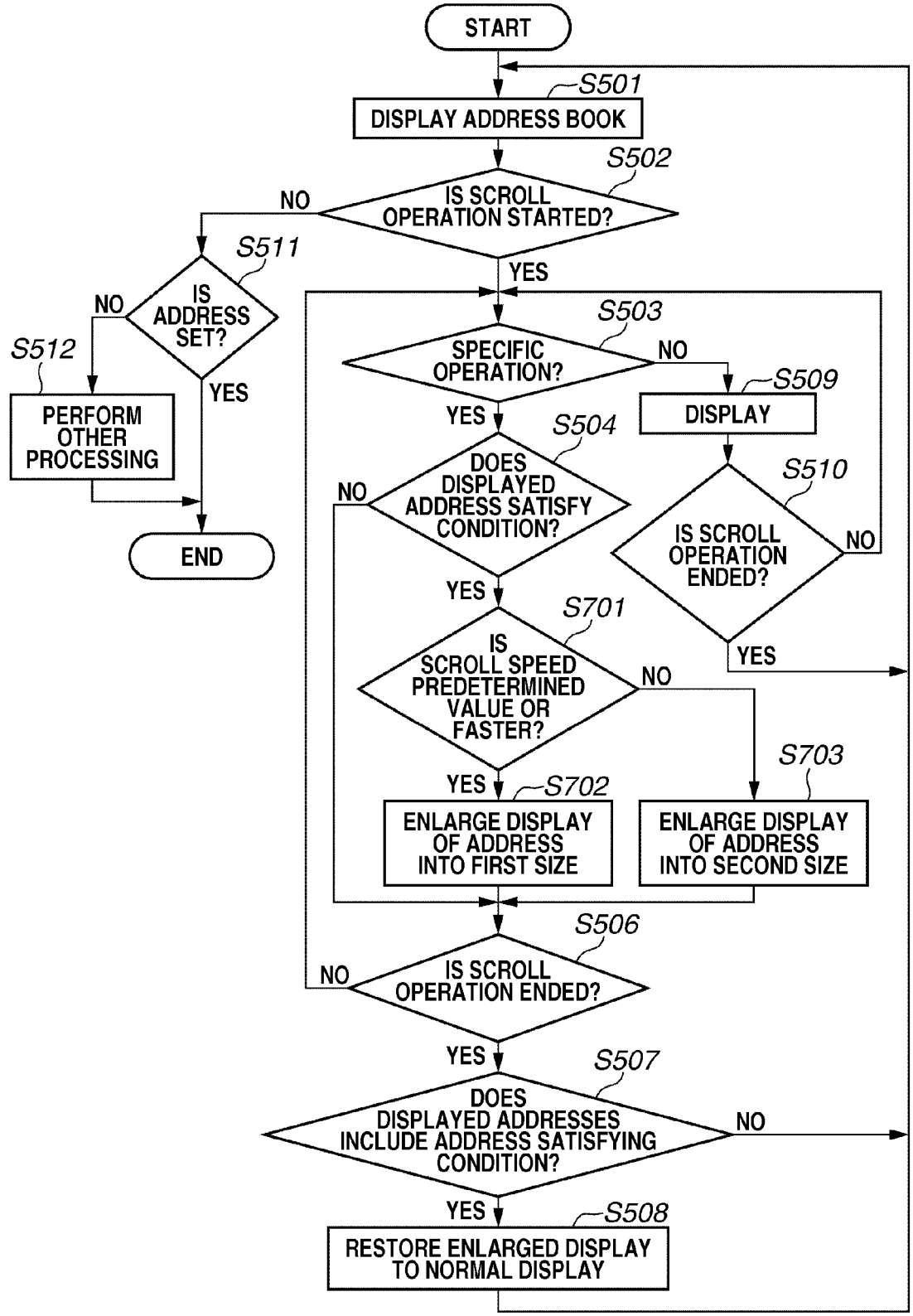

FIG.9A

E-MAIL TRANSMISSION

[ADDRESS BOOK]

○ LIST OF ALL ADDRESSES ▼

| ✓ TYPE | NAME | ADDRESS |
|---|---|---|
| ▣ | AIZAWA | Aizawa@AAA.co.jp |
| ▣ | AIDA | Aida@AAA.co.jp |
| ▣ | AIBA | Aiba@AAA.co.jp |
| ▣ | AIHARA | Aihara@AAA.co.jp |
| ▣ | AOKI | Aoki@AAA.co.jp |
| ▣ | AOTA | Aota@AAA.co.jp |
| ▣ | AKAI | Akai@AAA.co.jp |

NUMBER OF ADDRESSES: 0

901 FLICK

| ALL | A | KA | SA | TA | NA | HA | MA | YA... | A-Z | 0-9 |

REGISTER/ EDIT

SEARCH BY NAME

✗ CANCEL        OK ↵

E-MAIL TRANSMISSION

[ADDRESS BOOK]

○ LIST OF ALL ADDRESSES ▼

| ✓ TYPE | NAME | ADDRESS |
|---|---|---|
| ▣ | KOSAKA | Kosaka@AAA.co.jp |
| ▣ | SAKAI | sakai@AAA.co.jp |
| ▣ | SASAKI | sasaki@AAA.co.jp |
| ▣ | SATO | sato@AAA.co.jp |
| ▣ | SATODA | satoda@AAA.co.jp |
| ▣ | SANADA | sanada@AAA.co.jp |

NUMBER OF ADDRESSES: 0

902

| ALL | A | KA | SA | TA | NA | HA | MA | YA... | A-Z | 0-9 |

REGISTER/ EDIT

SEARCH BY NAME

✗ CANCEL        OK ↵

FIG.11

E-MAIL TRANSMISSION

[ADDRESS BOOK]

◯ LIST OF ALL ADDRESSES ▼

| | TYPE NAME | ADDRESS |
|---|---|---|
| ☐ | KOSAKA | Kosaka@AAA.co.jp |
| ☐ | SAKAI | sakai@AAA.co.jp |
| ☐ | SASAKI | sasaki@AAA.co.jp |
| ☐ | SATO | sato@AAA.co.jp |
| ☐ | SANADA | sanada@AAA.co.jp |

1101
1102

NUMBER OF ADDRESSES: 0

| ALL | A | KA | SA | TA | NA | HA | MA | YA... | A-Z | 0-9 |

REGISTER/EDIT

SEARCH BY NAME

✕ CANCEL

OK ↵

INFORMATION PROCESSING APPARATUS, CONTROL METHOD THEREOF, AND STORAGE MEDIUM

BACKGROUND OF THE INVENTION

1. Field of the Invention

The present invention relates to an information processing apparatus displaying content, a control method thereof, and storage medium.

2. Description of the Related Art

In recent years, computers including a touch panel have been generally used. When such computers are used, arbitrary content is displayed in a list on a screen, and the list is scrolled by a flick operation thereon. Such computers can be operated by the flick operation for scrolling the content displayed on the screen and also a user's operation for moving a displayed scroll bar.

The user can easily, instinctively understand the flick operation for scrolling the display, however, compared with the operation by using the scroll bar, the user cannot easily find desired content during scroll display. One of the reasons of the problem described above is that the flick operation generally used determines a scroll speed by a force of flicking a touch panel with a finger (speed of finger movement), and thus the user cannot easily adjust the scroll speed to be optimum.

As a solution of the problem described above, Japanese Patent Application No. 2010-152777 discusses a technique for, when a plurality of pieces of content is displayed in a list, calculating an importance level for each content based on user information and changing the scroll speed depending on the calculated importance level therefor. Specifically, while the content having the high importance level is scroll-displayed, the scroll speed decelerates.

According to the conventional technique, the user can easily find the content having the high importance level during scrolling. However, by a method for changing the scroll speed according to the importance level of the content, smooth scroll, which is a characteristic of the scroll by the flick operation, cannot be performed. Particularly, when a lot of content having the high importance level are included, since the only low speed scroll can be performed, the characteristic of the scroll by the flick operation cannot be fully used, and further operability of the flick operation may be deteriorated.

SUMMARY OF THE INVENTION

The present invention is directed to an information processing apparatus that facilitates finding desired content while displayed content is being scrolled by an operation such as a flick operation.

According to an aspect of the present invention, an information processing apparatus includes a display unit configured to display a plurality of pieces of content, and a display control unit configured to cause, during scrolling the plurality of pieces of content displayed on the display unit, a display of content satisfying a specific condition in a form different from that of other content, wherein the display control unit is configured to switch whether to display the content satisfying the specific condition in the form different from that of other content depending on whether scroll of the plurality of pieces of content is caused by a specific operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is an example of a screen displayed on the display of the information processing apparatus according to the first exemplary embodiment.

FIG. 7 is a flowchart illustrating an operation of the information processing apparatus according to a second exemplary embodiment.

FIGS. 9A and 9B are examples of screens displayed on the display of the information processing apparatus according to the second exemplary embodiment.

FIG. 11 is an example of a screen displayed on the display of the information processing apparatus according to the second exemplary embodiment.

DESCRIPTION OF THE EMBODIMENTS

Various exemplary embodiments, features, and aspects of the invention will be described in detail below with reference to the drawings.

Figure 1:
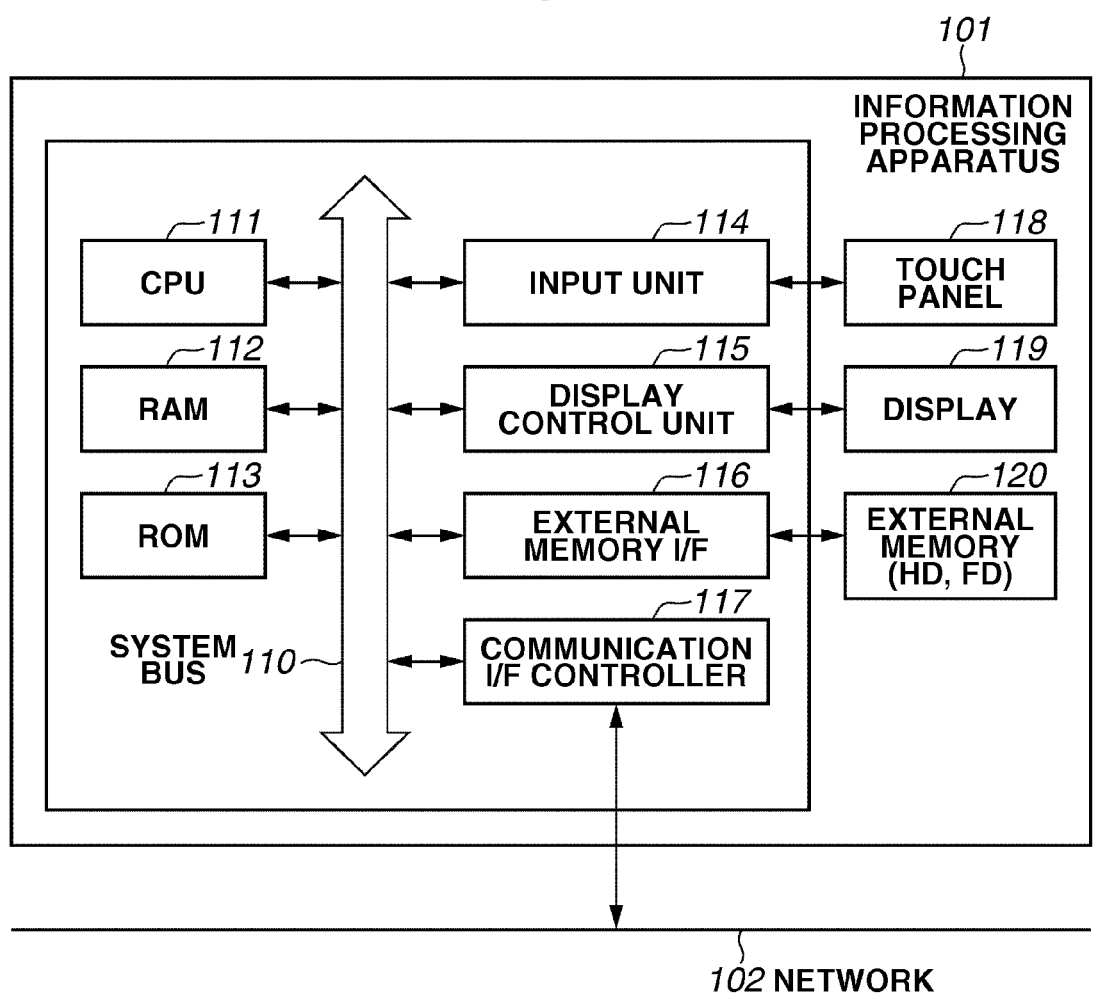
FIG. 1 illustrates a hardware configuration of an information processing apparatus according to an exemplary embodiment.

FIG. 1 illustrates a hardware configuration of an information processing apparatus 101 to which each exemplary embodiment can be applied.

In FIG. 1, a central processing unit (CPU) 111, a random access memory (RAM) 112, a read only memory (ROM) 113, an input unit 114, a display control unit 115, an external memory interface (I/F) 116, and a communication I/F controller 117 are connected to a system bus 110. Further, a touch panel 118, a display 119, and an external memory 120 are also connected to the system bus 110. Each unit connected to the system bus 110 can transmit/receive data to/from each other via the system bus 110.

The ROM 113 is a non-volatile memory, and stores image data, other data, and various kinds of programs for causing the CPU 111 to operate in respective predetermined regions. The RAM 112 is a volatile memory, and used as a main memory of the CPU 111 and a temporary storage region of a work area.

The CPU 111 controls each unit of the information processing apparatus 101 using the RAM 112 as a work memory according to a program stored in the ROM 113, for example. The program for operating the information processing apparatus 101 is not limited to a program stored in the ROM 113, but may be previously stored in the external memory (such as a hard disk) 120.

The input unit 114 receives a user's operation, generates a control signal according to the operation, and then supplies the control signal to the CPU 111. For example, the input unit 114 includes a pointing device such as a character information input device (not illustrated) including a keyboard, a mouse (not illustrated), and a touch panel 118 as an input device for receiving the user's operation.

The touch panel 118 is an input device for outputting coordinate information corresponding to a position where the user touches a planar input unit, for example. The CPU 111 controls each unit of the information processing apparatus 101 according to the program based on the control signal generated and supplied in the input unit 114 according to the user's operation performed on the input device. With this arrangement, the CPU 111 can allow the information processing apparatus 101 to perform the operation according to the user's operation.

The display control unit 115 outputs a display signal for displaying an image on a display 119. For example, a display control signal generated by the CPU 111 according to the program is supplied to the display control unit 115. The display control unit 115 generates the display signal based on the display control signal and outputs the display signal to the display 119. For example, the display control unit 115 displays on the display 119 a graphical user interface (GUI) screen included in a GUI based on the display control signal generated by the CPU 111.

The touch panel 118 is composed integrally with the display 119. For example, the touch panel 118 is composed in such a manner that transmittance of light does not disturb display on the display 119, and mounted on a top layer of a display surface of the display 119. An input coordinate on the touch panel 118 and a display coordinate on the display 119 are associated with each other. With this arrangement, the GUI can be configured to make the user feel as if he/she could directly operate the screen displayed on the display 119.

The external memory I/F 116 can mount, for example, the hard disk, a floppy (registered trademark) disk, or the external memory 120 including a compact disk (CD), a digital versatile disk (DVD), and a memory card. Based on the control of the CPU 111, the external memory I/F 116 reads data from the mounted external memory 120 and writes the data into the external memory 120. The communication I/F controller 117 performs communication to various kinds of networks 102 including a local area network (LAN), internet, wired communication, and wireless communication, based on the control of the CPU 111.

The CPU 111 can detect the operation to the touch panel 118 and state of the touch panel 118 as below, for example. A finger or a pen touches a touch panel (hereinbelow, referred to as "touch down"). The finger or the pen is in contact with the touch panel (hereinbelow, referred to as "touch on"). The finger or the pen moves keeping in contact with the touch panel (hereinbelow, referred to as "move"). The finger or the pen that has been in contact with the touch panel is separated therefrom (hereinbelow, referred to as "touch up"). Nothing is in contact with the touch panel (hereinbelow, referred to as "touch off").

Such operations and position coordinates on which the finger or the pen is in contact with the touch panel are notified to the CPU 111 via the system bus 110, and based on the notified information, the CPU 111 determines what kind of operation has been performed on the touch panel.

In the "move", a movement direction in which the finger or the pen moves on the touch panel can be also determined for each vertical component and horizontal component on the touch panel based on a change of the position coordinate. Further, when the "touch up" is performed after a predetermined "move" has been performed following the "touch down" on the touch panel, it is determined that the finger or the pen has drawn a stroke. An operation for quickly drawing the stroke is referred to as "flick".

The flick is the operation for quickly moving the finger a certain distance keeping in contact with the touch panel, and then separating therefrom. In other words, the flick is the operation for quickly tracing as if a finger is flicked on the touch panel. The CPU 111 detects that the finger has performed the "move" a predetermined distance or more at a predetermined speed or faster, and when the "touch up" is detected at the same time, it is determined that the flick has been performed.

Further, when the "move" performed the predetermined distance or more is detected and then the "touch on" is detected at the same time, it is determined that drag has been performed. Any type of touch panel 118 may be used, for example, a resistance film type, a capacitance type, a surface elastic wave type, an infrared ray type, an electromagnetic type, an image recognition type, and an optical sensor type.

Figure 2:
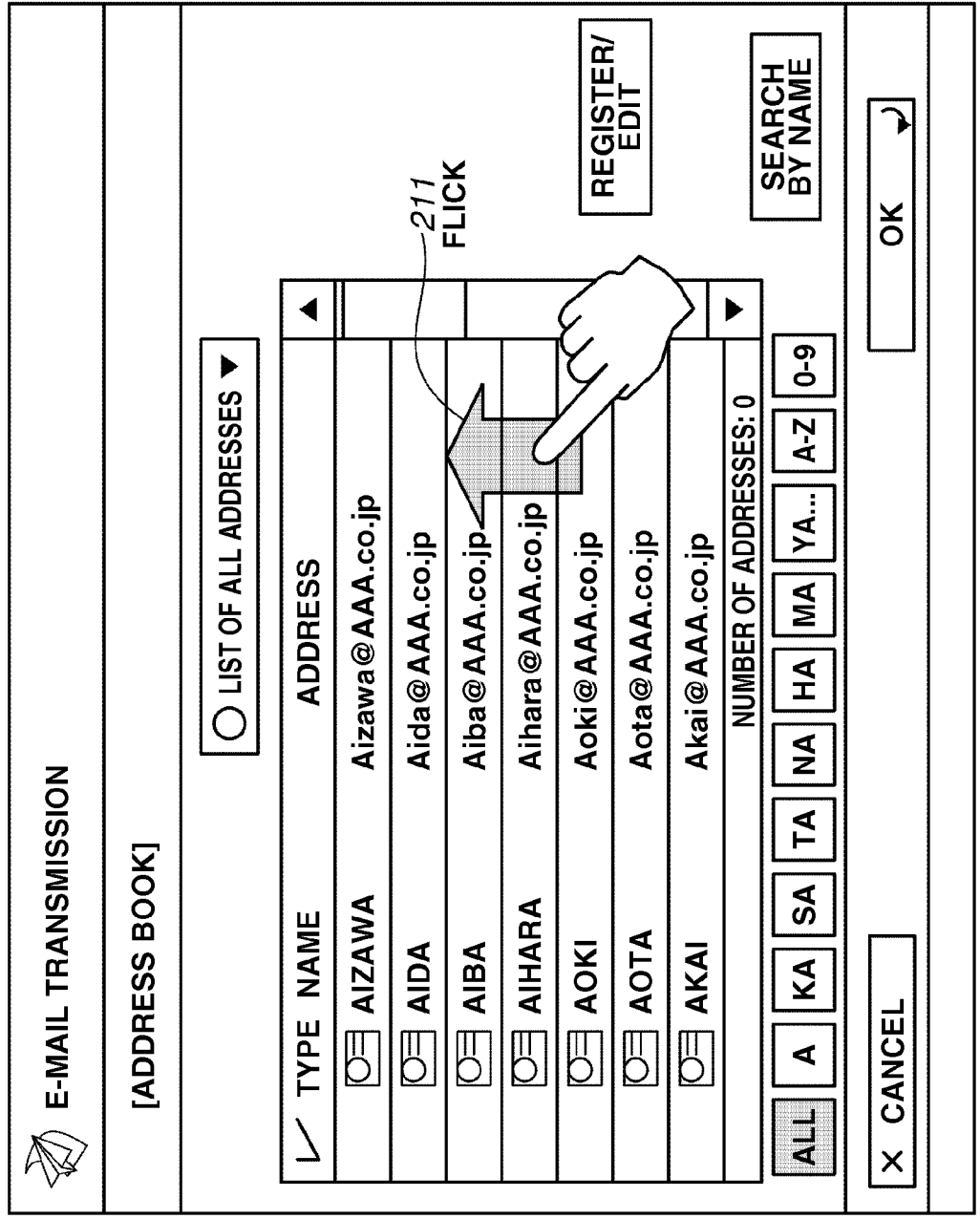
FIG. 2 is an example of a screen displayed on a display of the information processing apparatus according to a first exemplary embodiment.
Figure 3:
FIG. 3 is an example of a screen displayed on the display of the information processing apparatus according to the first exemplary embodiment.

A first exemplary embodiment will be described. FIGS. 2 and 3 illustrate display on the display 119 of the information processing apparatus 101 according to the first exemplary embodiment. Hereinbelow, with reference to FIGS. 2 and 3, a display example of the display 119 will be described according to the first exemplary embodiment.

FIG. 2 illustrates a screen for selecting an address that is to be a destination of an e-mail transmission when an e-mail transmission function which is one of the functions of data transmission provided in the information processing apparatus 101 is used. Data of an address book is stored in the external memory 120 of the information processing apparatus 101.

As illustrated in FIG. 2, when the address book includes a great amount of address data, a list of addresses does not fit into one screen on the display 119. Thus, the user may scroll the displayed list of the addresses to display the desired address on the display 119. FIG. 2 is an example where the user performs a flick operation (211) at an arbitrary point in a region where the list of the addresses is displayed on the display 119.

As illustrated in FIG. 2, when the user performs the flick operation in an upward direction, the displayed list of the addresses scrolls in the upward direction. FIG. 3 is an example of a display screen during scrolling. More specifically, FIG. 3 is an example of display at an instant timing during the scroll display.

According to the present exemplary embodiment, among a plurality of addresses included in the address book, the address satisfying a specific condition is displayed with enlargement larger than other address (address that does not satisfy the condition) during the scroll display.

In an example of FIG. 3, "SATO" is the address satisfying the specific condition, and other addresses ("KOSAKA", "SAKAI", "SASAKI", and "SATODA") do not satisfy the specific condition. Therefore, the address of "SATO" is performed enlargement display compared with the other addresses. The specific condition herein can be, for example, that, during a certain period, an address is used as an address of e-mail transmission the predetermined number of times or more.

Figure 4:
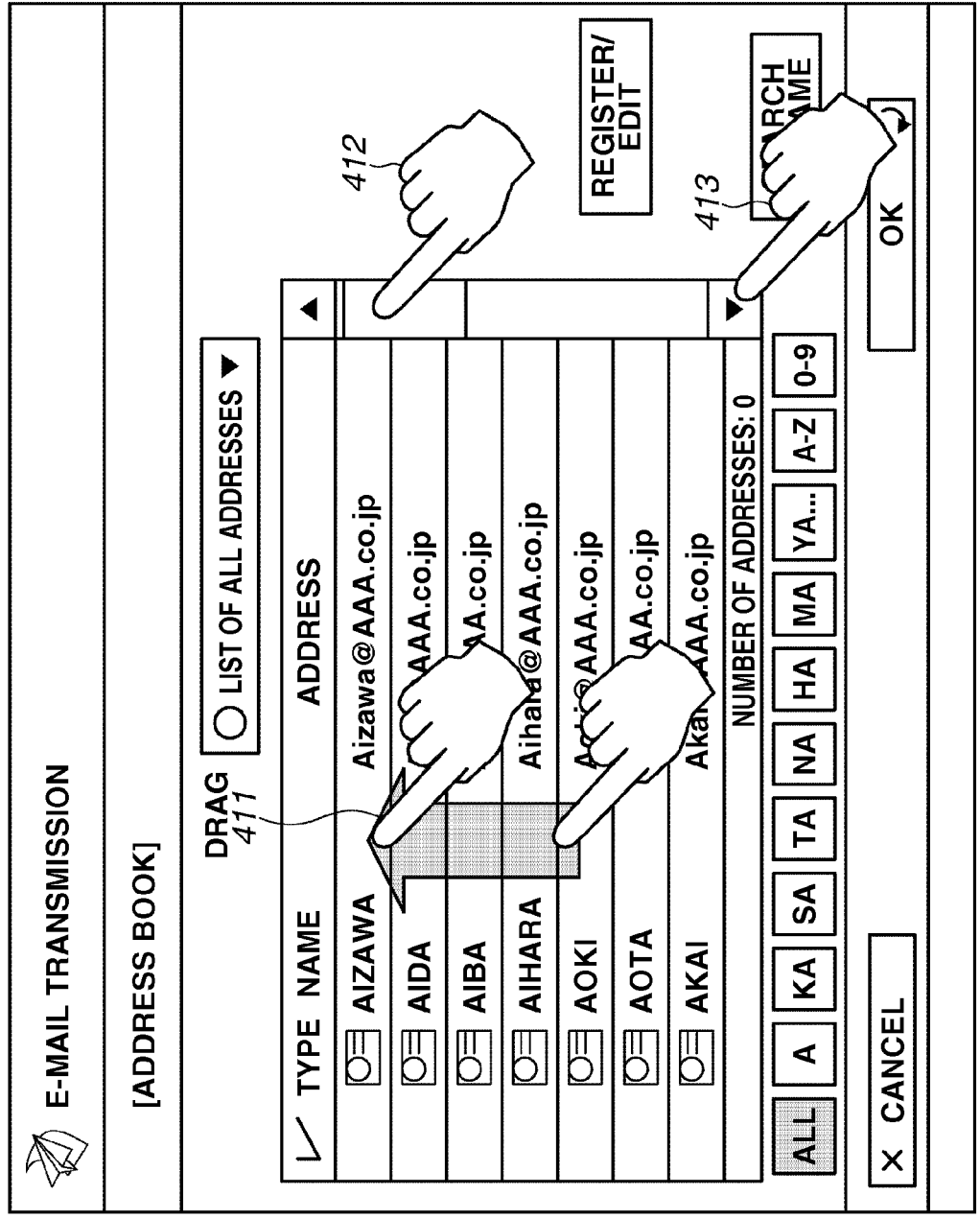
FIG. 4 illustrates an operation method for instructing scroll according to the first exemplary embodiment.

FIG. 4 illustrates an operation method other than the flick operation for scrolling the list of the addresses according to the present exemplary embodiment. According to the present exemplary embodiment, to scroll the list of the addresses, there are three operation methods in addition to the flick operation. However, the operation method for scrolling is not limited to the above-described four methods including the flick operation. A first operation method other than the flick operation is a method in which the user drags (411) an arbitrary point in a region in which the list of the addresses is displayed on the display 119.

By this method, the list of the addresses is scrolled by an amount of movement (movement distance) from a point of the "touch down" by the user to a point of the "touch up" thereby. A second method is to scroll using a scroll bar displayed on the display 119. More specifically, the user performs the "touch down" at the point where the scroll bar is displayed on the display 119 and drags keeping a "touch on" state (412).

By this method, depending on the movement amount of the scroll bar, the list of the addresses is scrolled. A third method is to press a scroll button displayed on the display 119. More specifically, the user performs the "touch down" at the point where the scroll button (arrow key of up or down) is displayed on the display 119, and performs an operation for keeping the "touch on" state (413). By this method, corresponding to a time period of the "touch on" on the scroll button, the list of the addresses is scrolled.

Figure 5:
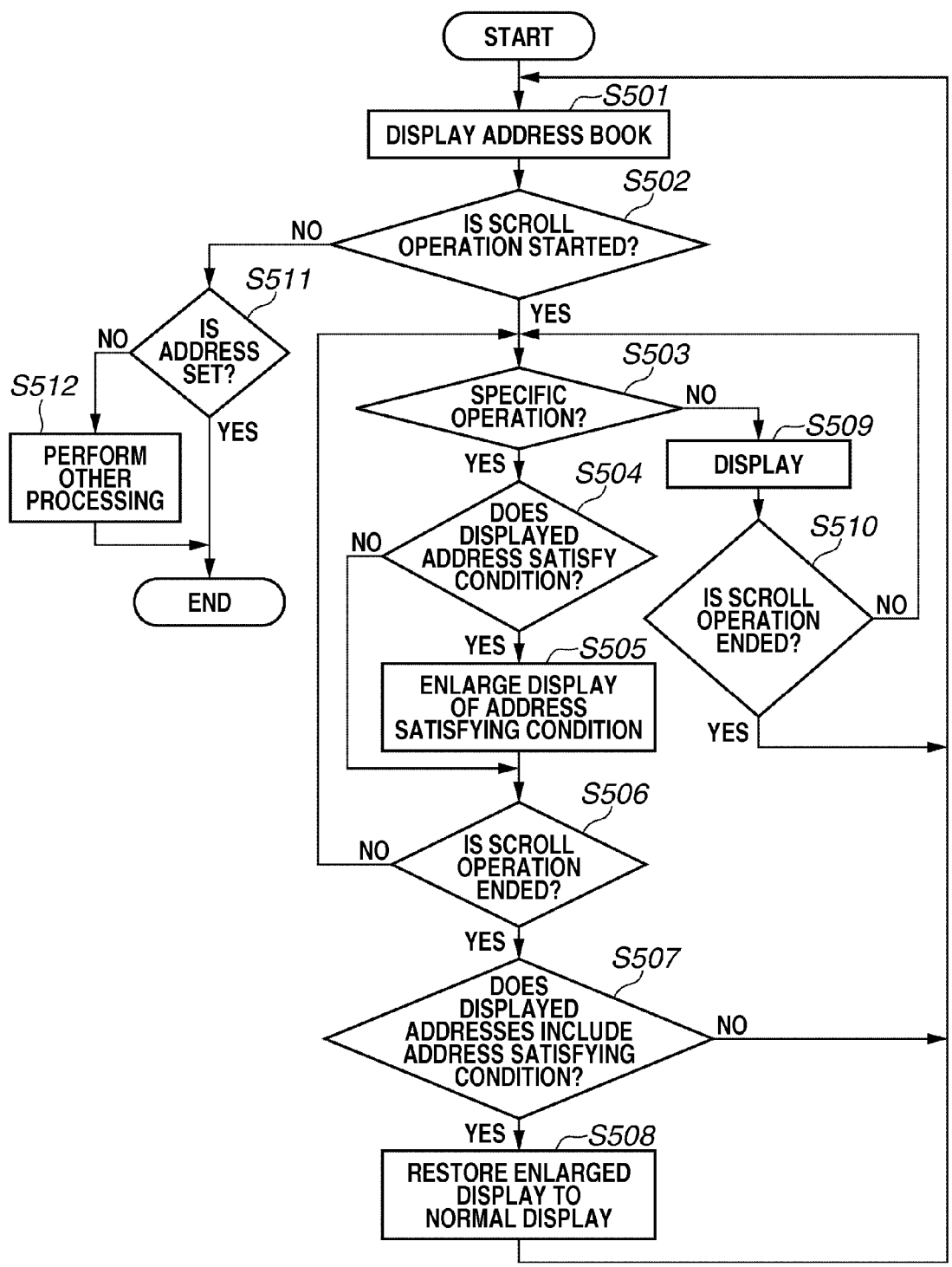
FIG. 5 is a flowchart illustrating an operation of the information processing apparatus according to the first exemplary embodiment.

With reference to FIG. 5, an operation of the information processing apparatus 101 according to the present exemplary embodiment will be described. FIG. 5 is a flowchart performed when the address book illustrated in FIG. 2 is displayed on the display 119 of the information processing apparatus 101 of the present exemplary embodiment. Each step illustrated in FIG. 5 is processed by the CPU 111 executing the program stored in the ROM 113 or the external memory 120.

In step S501, according to a predetermined operation by the user, the CPU 111 and the display control unit 115 display the list of the addresses included in the address book on the display 119. In step S502, the CPU 111 determines whether the scroll operation has been started. More specifically, it is determined whether the list of the addresses has been scrolled by any of the operation methods for performing the scroll described above.

As a result of the determination in step S502, if it is determined that the scroll operation has been started (YES in step S502), the processing proceeds to step S503. In step S503, the CPU 111 determines whether the started scroll operation has been caused by a specific operation method. According to the present exemplary embodiment, among the four methods described above for performing the scroll operation, two operations including the flick operation and the operation using the scroll button are defined as the specific operation method.

In other words, in step S503, the CPU 111 determines whether the started scroll operation has been caused by the flick operation or the operation using the scroll button. In the scroll operation by the flick operation and the operation using the scroll button, it is difficult to adjust the scroll speed to a desired speed by the user's operation.

On the other hand, in the scroll operation by the drag operation and the operation using the scroll bar, since the user's operation synchronizes with the scroll speed, it is comparatively easy for the user to intentionally adjust the scroll speed. Taking account of difference in operability, according to the present exemplary embodiment, the flick operation and the operation using the scroll button are defined as the specific operation and distinguished from other operations.

In other words, the specific operation can be referred to as the operation method in which it is difficult for the user to intentionally adjust the scroll speed. The method described above is just an example, and all of the four operations according to the present exemplary embodiment may be defined as the specific operation method. Or, if the scroll can be instructed by another operation other than the four operations, the another operation may be included in the specific operation method.

In such a case, the processing in step S503 is not performed. However, as described above, it is more beneficial that the operation inappropriate for adjusting the scroll speed (difficult to adjust) be defined as the specific operation method.

In step S503, if it is determined that the started scroll operation is caused by the specific operation method (YES in step S503), the processing proceeds to step S504. On the other hand, if it is determined that the started scroll operation is not caused by the specific operation method (NO in step S503), the processing proceeds to step S509.

In step S504, the CPU 111 determines whether the address displayed by scrolling specifies the specific condition. According to the present exemplary embodiment, a specific condition refers to that, during a certain specific period, an address is used as an address of E-mail transmission the predetermined number of times or more.

Herein, the specific period and the predetermined number of times are previously registered in the information processing apparatus 101 by the user or an administrator. Any user may be able to change values of the specific period and the predetermined number of times, or only an authorized user or administrator may be able to change the values. For example, usage at least once a week lately can be a specific condition.

According to the present exemplary embodiment, to perform decision in step S504, every time an e-mail is transmitted, the CPU 111 stores information about the address and the date and time of the transmission.

As a result in step S504, if it is determined that the address displayed by scrolling satisfies the specific condition (YES in step S504), the processing proceeds to step S505. In step S505, the CPU 111 changes a display portion corresponding to the address satisfying the condition into the enlargement display compared with display portions of other addresses in the list of the addresses.

While the address satisfying the condition is being scroll-displayed, the address is performed the scroll display in enlargement display state. An example of specific display in step S505 is as illustrated in FIG. 3. As a result of determination in step S504, if it is determined that the address that has been scrolled and displayed does not satisfy the specific condition (NO in step S504), the display of the address is not enlarged but the scroll display is performed in its own size.

In step S506, the CPU 111 determines whether the scroll operation has been ended. More specifically, when the scroll in operation is caused by the flick operation, it is determined whether the scroll operation in a predetermined time is ended and then the scroll of the list of the addresses has been stopped. On the other hand, when the scroll in operation is caused by the "touch on" operation by the scroll button, it is determined whether the finger or the pen has performed the "touch up" from the scroll button.

If it is determined that the scroll operation has not been ended (NO in step S506), steps from step S503 are repeatedly performed until the scroll operation is ended. If it is determined that the scroll operation has been ended (YES in step S506), the processing proceeds to step S507.

In step S507, the CPU 111 determines whether the displayed list of the addresses includes the address satisfying the condition determined in step S504. More specifically, it is determined whether the address whose display during scrolling is enlarged by the processing in step S506 is included in the displayed list of the addresses. As a result of the determination in step S507, if it is determined that the address satisfying the condition is included (YES in step S507), the processing proceeds to step S508.

In step S508, the CPU 111 restores the size of the display of the address, whose display is enlarged by the processing in step S505, to the original size to adjust to other addresses size. Subsequently, the processing returns to step S501. As a result of step S507, if it is determined that the address satisfying the condition is not included (NO in step S507), the processing returns to step S501.

In step S503, if it is determined that the started scroll operation is not caused by the specific operation method (NO in step S503), the processing proceeds to step S509. In other words, in the scroll operation is caused by the drag operation or the operation using the scroll bar, the processing proceeds to step S509. In step S509, the CPU 111 performs scroll-display of the list of the addresses.

In step S510, the CPU 111 determines whether the scroll operation has been ended. If it is determined that the scroll operation has not been ended (NO in step S510), the processing is repeatedly performed from step S503 until the scroll operation is ended. On the other hand, if the scroll operation has been ended (YES in step S510), the processing returns to step S501.

When the scroll operation is performed, the information processing apparatus 101 according to the present exemplary embodiment switches whether to perform scroll-display with enlarging the address in the address book satisfying the specific condition depending on whether the scroll operation is caused by the specific operation.

In other words, the scroll operation is caused by the flick operation or the operation using the scroll button, the address satisfying the specific condition is scroll-displayed with enlarged state. On the other hand, if the scroll operation is caused by the drag operation or the operation using the scroll bar, the address satisfying the specific condition is not performed enlargement display but each address included in the address book is scroll-displayed in the same size.

In step S502, if it is not determined that the scroll operation is started (NO in step S502), the processing proceeds to step S511. In step S511, the CPU 111 determines whether the address of the e-mail transmission has been set. More specifically, in a state where an arbitrary address in the screen of the list of the addresses illustrated in FIG. 2 is selected by the user, it is determined whether an OK button has been pressed.

In step S511, if it is determined that the address of the e-mail transmission has been set (YES in step S511), the processing for displaying the address book is ended. On the other hand, in step S511, if it is not determined that the address of the e-mail transmission has been set (NO in step S511), the processing proceeds to step S512. After the other arbitrary processing is performed, the processing for displaying the address book is ended.

According to the information processing apparatus of the present exemplary embodiment, even when the scroll operation is performed by the difficult operation for the user to arbitrarily adjust the scroll speed, the user is less likely to miss the desired content during the scroll display. Particularly, without deteriorating a merit of the smooth scroll by the flick operation, the user can be prevented from missing the desired content during the scroll display.

In the description of the exemplary embodiment described above, an example describes that the condition for enlarging display of the address larger is that, during a certain period, the address is used the predetermined number of times or more as the address for transmitting e-mail. However, if the user can arbitrarily change the condition, the user can find the desired address during the scroll display more easily.

In the description of the exemplary embodiment, the scroll operation for the list of the address data included in the address book is described as an example, however, the embodiments are not limited to the list of the addresses and can be applied to the scroll operation of various kinds of content that can be displayed on the display.

Further, according to the exemplary embodiment described above, the "enlargement display" is described as an example of highlighting for avoiding missing the content satisfying the condition during the scrolling operation, however the method of highlighting is not limited to the "enlargement display". In other words, as long as the content satisfying the above-described specific condition and the content that does not are displayed to be distinguished from each other, the display method is not limited. For example, in place of enlarging the display size, display color may be changed.

In other words, in place of "enlarge display" described in step S505 illustrated in FIG. 5, "change display color" may be described. Further, in step S508, "restore enlarged display to normal display" may be changed to "restore display color to normal color". According to this method, the same effects as those described above can be obtained.

FIG. 6 illustrates a screen when the display color of the specific address satisfying the condition is changed during the scrolling operation. Compared with FIG. 3, the address of "SATO" is not displayed en with enlargement, and the display color is changed compared with other addresses (601) instead. In addition to the display color, various display form can be considered, for example, shaded display, black and white reversal display, and change of character font without changing colors.

A second exemplary embodiment will be described. According to the above-described first exemplary embodiment, it is determined whether the content is displayed with enlargement during scrolling depending on whether the displayed content satisfies the specific condition. On the other hand, according to the second exemplary embodiment, not simply switching enlarge/not enlarge but an enlargement rate is changed based on various conditions. The second exemplary embodiment will be described focusing on difference between the above-described first exemplary embodiment and the second exemplary embodiment hereinbelow.

First, an exemplary embodiment will be described in which "enlargement rate is changed depending on the detected scroll speed", as an example of the condition for changing the enlargement rate.

FIG. 7 is a flowchart illustrating the operation of the information processing apparatus 101 according to the present exemplary embodiment and corresponds to FIG. 5 of the first exemplary embodiment. A step in FIG. 7 same as that in FIG. 5 is provided with the same reference numeral, and a different step from that in FIG. 5 is provided with the different reference numeral. Portions different from those in FIG. 5 will be described hereinbelow. Each step illustrated in FIG. 7 is, similarly to FIG. 5, processed when the CPU 111 executes the program stored in the ROM 113 or the external memory 120 of the information processing apparatus 101.

As a result in step S503, if it is determined that the scroll operation is caused by the specific operation (YES in step S503), and further, in step S504, the address displayed by scrolling satisfies the specific condition (YES in step S504), the processing proceeds to step S701. In FIG. 5, the specific operation in step S503 is defined as the flick operation or the operation using the scroll button, however, the specific operation according to the present exemplary embodiment is defined as only the flick operation.

In step S701, the CPU 111 detects the scroll speed and determines whether the detected scroll speed is higher than a predetermined value (threshold value). The scroll speed when the scroll operation is caused by the flick operation varies depending on a degree of the flick (strength or speed of flicking the finger). In step S701, if it is determined that the scroll speed is higher than the predetermined value (YES in step S701), the processing proceeds to step S702. On the other hand, if it is determined that the scroll speed is lower than the predetermined value (NO in step S701), the processing proceeds to step S703.

In step S702, the CPU 111 changes the display portion corresponding to the address satisfying the condition into a first size that is enlarged in comparison with the display portion of other addresses in the list of the addresses. The address is scroll-displayed with enlargement while the address satisfying the condition is being displayed in the scroll display.

Further, in step S703, the CPU 111 changes the display portion corresponding to the address satisfying the condition into a second size that is enlarged in comparison with the display portion of the other addresses in the list of the addresses. The address is scroll-displayed with enlargement while the address satisfying the condition is being scroll-displayed.

The above-described first size is set larger than the above-described second size. A degree of size can be arbitrarily set. For example, with reference to a size of display of the address that does not satisfy the condition (normal size), it may be set that the second size is double of the address in a normal size, and the first size is further double of the second size (four times larger than normal size). In other words, since the higher the scroll speed is, the more difficult to visually recognize the content displayed during scrolling, the content enlargement rate is increased further as the speed is higher. With this arrangement, even when the scroll is caused by the flick operation at the higher speed than the user expects, the user is less likely to miss the desired content.

According to the above-described example, the enlargement rate is set to two levels depending on whether the scroll speed is higher than a predetermined threshold value, however, the enlargement rate may be further finely divided. Or, the enlargement rate may be set in proportion to the speed. More specifically, when the reference speed is doubled for the scroll speed, the enlargement rate may be also doubled.

Figure 8A:
FIGS. 8A and 8B are examples of screens displayed on the display of the information processing apparatus according to the second exemplary embodiment.
Figure 8B:
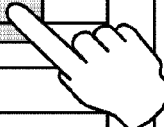

FIGS. 8A, 8B, 9A, and 9B illustrate examples of screens displaying cases of "changing the enlargement rate depending on the scroll speed". FIGS. 8A and 8B are examples of displaying cases where the scroll speed is higher than the predetermined value (step S702). FIGS. 9A and 9B are examples of displaying cases where the scroll speed is lower than the predetermined value (step S703).

The finger is flicked stronger in the flick operation 801 illustrated in FIG. 8A than that of the flick operation 901 illustrated in FIG. 9A. As a result, the scroll speed illustrated in FIG. 8B is higher than that in FIG. 9B, and thus, the address of "SATO" 802 illustrated in FIG. 8B and satisfying the condition is displayed much larger than the address of "SATO" 902 illustrated in FIG. 9B.

Subsequently, as another example of the condition for changing the enlargement rate, an exemplary embodiment of a case will be described where "change the enlargement rate depending on whether the content satisfying the condition continues".

Figure 10:
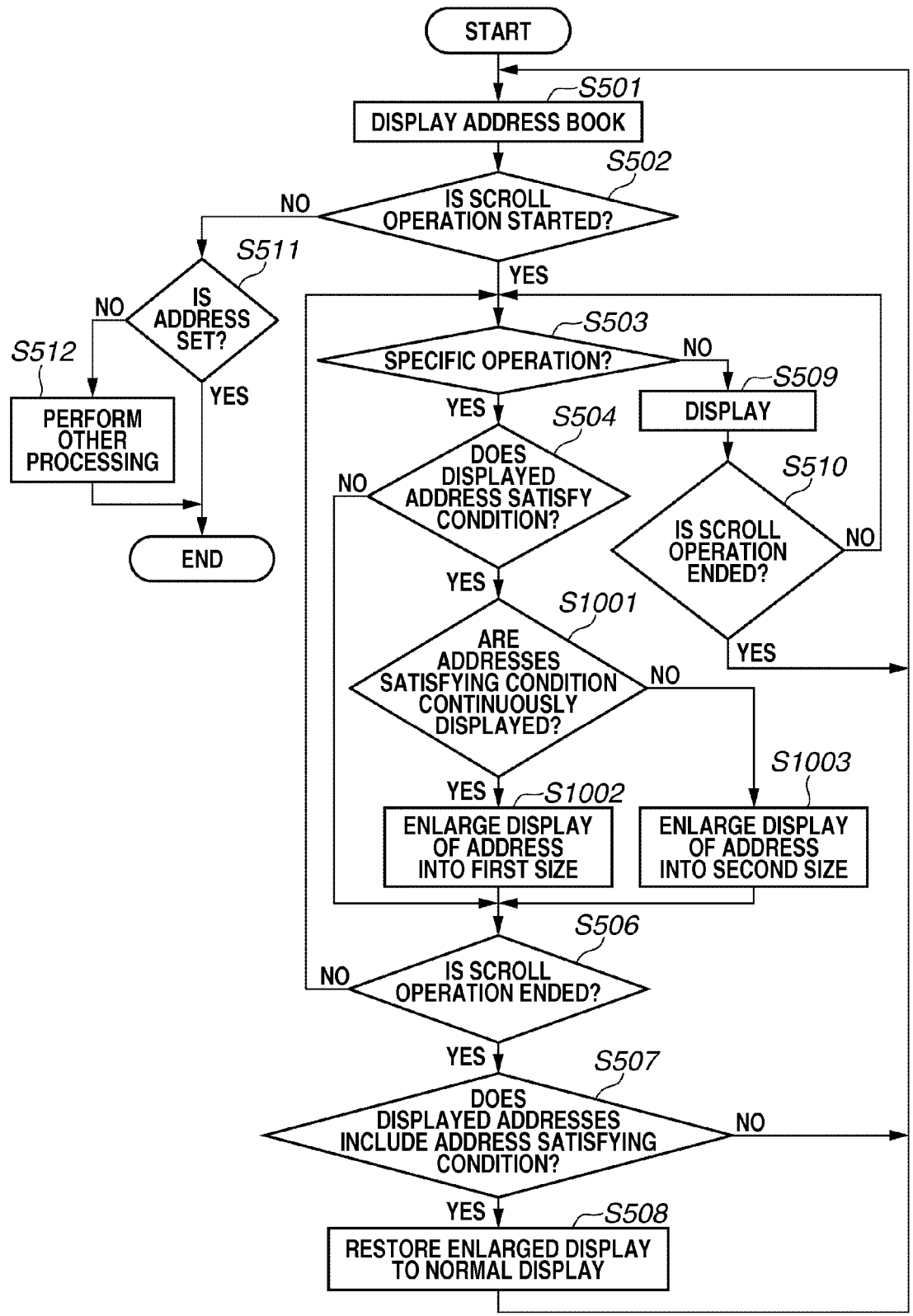
FIG. 10 is a flowchart illustrating an operation of the information processing apparatus according to the second exemplary embodiment.

FIG. 10 is a flowchart illustrating the operation of the information processing apparatus 101 according to the present exemplary embodiment and corresponds to FIG. 5 of the first exemplary embodiment. The step in FIG. 10 same as that in FIG. 5 is provided with the same reference numeral, and a different step from that in FIG. 5 is provided with the different reference numeral.

Portions different from FIG. 5 will be described hereinbelow. Similar to FIG. 5, each step illustrated in FIG. 10 is processed when the CPU 111 executes the program stored in the ROM 113 or the external memory 120 of the information processing apparatus 101.

As a result of the determination in step S503, when it is determined that the scroll operation is caused by the specific operation and further, in step S504, the address displayed by scrolling satisfies the specific condition, the processing proceeds to step S1001.

In step S1001, the CPU 111 determines whether the address satisfying the specific condition is continuously displayed. As a result, if it is determined that the address is continuously displayed (YES in step S1001), the processing proceeds to step S1002. If it is determined that the address is not continuously displayed (NO in step S1001), the processing proceeds to step S1003. In step S1002, the CPU 111 changes the display portion corresponding to the address satisfying the condition into the first size that is enlarged in comparison with the display portion of other addresses in the list of the addresses.

The address is scroll-displayed with enlargement while the address satisfying the condition is being scroll-displayed. Further, in step S1003, the CPU 111 changes the display portion corresponding to the address satisfying the condition into the second size that is enlarged in comparison with the display portion of the other addresses in the list of the addresses.

The address is scroll-displayed with enlargement while the address satisfying the condition is being scroll-displayed. In contrast to a case of "changing the enlargement rate depending on the scroll speed", in this example, the above-described first size is set smaller than the above-described second size.

More specifically, when the addresses satisfying the specific condition continue, the addresses satisfying the specific condition are displayed smaller in size than those that do not continue. A degree of size can be arbitrarily set. For example, with reference to a size of display of the address that does not satisfy the condition (normal size), it may be set that the first size is double of the address in the normal size, and the second size is further double of the first size (four times larger than normal size).

According to the above-described example, the enlargement rate is set to two levels depending on whether the addresses satisfying the condition continue, however, the enlargement rate may be further finely divided. For example, the enlargement rate may vary associating with the number of continuing addresses. More specifically, when the addresses do not continue, the enlargement rate may be set to 1, when two addresses continue, the enlargement rate may be set to ½ of the addresses that do not continue, when three addresses continue, the enlargement rate may be set to ⅓ thereof, and when "N" addresses continue, the enlargement rate may be set to 1/N thereof. In this case also, the size of the display of the address satisfying the specific condition may be larger than that of the address that does not satisfy the condition.

FIG. 11 illustrates an example of a display screen of a case of "change the enlargement rate depending on whether the content satisfying the condition continues". In an example illustrated in FIG. 11, the address of "SATO" 1101 and the address of "SANADA" 1102 are continuously displayed as the address satisfying the condition. In such a case, the addresses are displayed smaller in size compared with a case where either one of "SATO" and "SANADA" satisfies the condition. For example, compared with the address of "SATO" illustrated in FIG. 3, that of "SATO" illustrated in FIG. 11 is displayed smaller.

Further, as another example of the condition for changing the enlargement rate, an exemplary embodiment of a case of "change the enlargement rate depending on a total amount of the content to be scrolled" will be described.

According to this example, unlike the above-described example, if a total number of pieces of content to be scrolled is less than a predetermined number, even if the content satisfying the condition is included, the content is not displayed with enlargement. With reference to the flowchart illustrated in FIG. 5, this example will be described. Similar to the processing described above, the processing described below is also executed by the CPU 111 of the information processing apparatus 101. In step S502 of a flow illustrated in FIG. 5, if it is determined that the scroll operation is started (YES in step S502), the CPU 111 counts the total number of pieces of the content to be scrolled by the scroll operation.

In the example of the address book, the number of addresses included in the address book displayed by scrolling is counted. Subsequently, the CPU 111 determines whether the counted number is more than a predetermined number. If it is determined that the counted number is more than the predetermined number, the processing proceeds to step S503, and then the CPU 111 determines whether the scroll operation is caused by the specific operation. The subsequent processing is performed as described with reference to FIG. 5. On the other hand, if the CPU 111 determines that the counted number is less than the predetermined number, the processing proceeds to step S509 without performing determination in step S503. The subsequent processing is performed as described with reference to FIG. 5.

As described above, according to this exemplary example, if the total number of pieces of the content to be scrolled is less than the predetermined number, even if the content satisfying the condition is included, the content is not displayed with enlargement. Since, when the small total number of pieces of the content to be scrolled is included, the scroll operation itself is performed in a short period. Thus, the user is less likely to miss the desired content, and the unnecessary enlargement display is avoided.

As described above, according to the second exemplary embodiment, in addition to switching to enlarge display or not based on whether the content to be scrolled satisfies the condition, the enlargement rate is changed according to various conditions. According to the second exemplary embodiment, in addition to acquiring the same effect as that of the first exemplary embodiment, the easier scroll display can be provided to the user.

Subsequently a third exemplary embodiment will be described. According to the above-described first exemplary embodiment, when the displayed content satisfies the specific condition, the content is displayed with enlargement, or the display color is changed, for example, to perform highlighting of the content. On the other hand, according to the third exemplary embodiment, when the content satisfying the specific condition is displayed in the scroll display, the content is stopped at a predetermined stop position. The third exemplary embodiment will be described focusing on difference with the first exemplary embodiment described above.

Figure 12A:
FIGS. 12A, 12B, and 12C are examples of screens displayed on the display of the information processing apparatus according to a third exemplary embodiment.
Figure 12B:
Figure 12C:

FIGS. 12A, 12B, and 12C are examples of screens displayed on the display 119 of the information processing apparatus 101 according to the present exemplary embodiment. Each screen illustrated in FIGS. 12A, 12B, and 12C illustrate the screens during the scroll operation when the address book is scrolled upwardly by the flick operation, and are the display examples when the time has elapsed in order of FIGS. 12A, 12B, and 12C.

In the present exemplary embodiment, the information processing apparatus 101 is operated according to the flowchart illustrated in FIG. 5, however, a part of step is differently performed. Even if it is determined that the address satisfies the specific condition in step S504, according to the present exemplary embodiment, the display of the address is not enlarged or the display color is not changed. Instead, the address is stopped and displayed at the predetermined position in the list of the addresses during the scroll display.

In the example illustrated in FIGS. 12A, 12B, and 12C, assuming that the address of "KUBOTA" 1201 satisfies the specific condition. At certain timing during scrolling, the addresses are displayed as illustrated in FIG. 12A. Subsequently as a result of scrolling, the display is changed as illustrated in FIG. 12B. At this point, the address of "KUBOTA" is moved to a position 1202.

Subsequently, as a result of further scrolling, the display is changed as illustrated in FIG. 12C. At this point, the address of "KUBOTA" is stopped at a position 1203 (same position as 1202). More specifically, the scroll display advances and the address of "KUBOYAMA" displayed right below "KUBOTA" moves to outside of being displayed from FIG. 12B to FIG. 12C. However, the address of "KUBOTA" above the address of "KUBOYAMA" remains to be displayed.

As described above, according to the present exemplary embodiment, as an example of the highlighting of the content satisfying the specific condition, it is characterized that the content is stopped and displayed at the predetermined position during the scroll display.

The content stopped at the predetermined position may move to outside of being displayed by scrolling after a predetermined time elapses. Or, when the content satisfying the specific condition in addition to the stopped content is scrolled and moved to the position, the moved content may be displayed at the stop position in replacement of the stopped content.

Or, when a plurality of pieces of content satisfying the specific condition becomes display target, several pieces of content may be stopped and displayed at the stop position. At this point, the maximum number of pieces of content to be stopped and displayed may be previously determined.

Further, in the examples illustrated in FIGS. 12A, 12B, and 12C, the stop position is set to the top end in a scroll direction (in this case, upward direction), an arbitrary position other than the top end can be set as the stop position.

As described above, according to the third exemplary embodiment, similarly to the first exemplary embodiment, without deteriorating the merit of scrolling by the specific operation such as the flick operation, the user can be prevented from missing the desired content during the scroll display.

Other exemplary embodiments will be described. As described above, the present invention is described in detail based on the appropriate exemplary embodiments, however the present invention is not limited to the exemplary embodiments, and includes various embodiments without departing from the scope and spirit of the invention. Further, parts of the above-described exemplary embodiment may be appropriately combined.

For example, the content displayed on the display in the scroll display is not limited to information about the address in the address book. As long as the content can be scroll-displayed, embodiments can be applied to the display of any data other than the address. Further, in addition to the upward direction, embodiments can be applied to any scroll direction.

Further, any condition can be adopted as the specific condition, which becomes a determination reference about whether to perform highlighting during the scroll display. In the above-described exemplary embodiments, a case of the information about the address included in the address book is described as an example of the content, and the condition is that the address is used the predetermined times or more during the predetermined period.

Furthermore, the user is authenticated, and the condition can be determined to usage history for each user about whether the authenticated user uses the address during a certain period. Moreover, the condition may not be determined to a parameter that is dynamically changed such as the usage history, but the predetermined content may be highlighted and displayed.

This can be realized, for example, by determining the content previously set to have high importance as the content satisfying the condition. In addition to the above-described conditions, various kinds of conditions can be considered. For example, the address is used just before, the first address having a new initial character of the address, and various conditions may be used.

Further, the above-described information processing apparatus 101 includes various devices. For example, in addition to a personal computer, a personal digital assistance (PDA), and a cellular phone terminal, the information processing apparatus 101 includes a printer scanner, a facsimile, a copy machine, multi function peripheral, a camera, a video camera, and other image viewers.

Embodiments can be realized by executing the processing described below. More specifically, embodiments are performed by supplying a software (program) realizing a function of the above-described exemplary embodiments to a system or the apparatus via the network or various kinds of non-transitory storage mediums and reading the program code by the system or a computer (or CPU or micro-processor unit (MPU)) of the apparatus. In such a case, the program and the non-transitory storage medium storing the program are included in an embodiment.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present invention. In an example, a computer-readable storage medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-261840 filed Nov. 30, 2011, which is hereby incorporated by reference herein in its entirety.

What is claimed is:

1. An information processing apparatus having a touch panel, the information processing apparatus comprising:
   a display configured to display a plurality of items, wherein at least some of the plurality of items include data about a data transmission address; and
   a display control unit configured to cause the plurality of items, displayed on the display, to be scroll-displayed in response to receiving communication regarding a flick operation performed on the touch panel or a drag operation performed on the touch panel,
   wherein, in response to receiving communication regarding the flick operation being performed, the display control unit causes an item that satisfies a specific condition to be displayed in a form different from that of a displayed other item while the displayed plurality of items is scroll-displayed,
   wherein, in response to receiving communication regarding the drag operation being performed, the display control unit refrains from causing the item satisfying the specific condition to be displayed in the form different from that of the displayed other item while the displayed plurality of items is scroll-displayed,
   wherein the specific condition is that a data transmission address is used a predetermined number of times during a predetermined period, and
   wherein, depending on a detected scroll speed, the display control unit is configured to determine an enlargement for displaying the item satisfying the specific condition.

2. The information processing apparatus according to claim 1, wherein, in response to ending the scroll display, the display control unit causes the item satisfying the specific condition to be displayed in a form that is not different from that of the displayed other item.

3. The information processing apparatus according to claim 1, further comprising a transmission unit configured to transmit data,
   wherein a data transmission address is for the transmission unit, and
   wherein the display is configured to display a list of data transmission addresses for the transmission unit.

4. The information processing apparatus according to claim 3, wherein the specific condition further is that the data about the data transmission address is used a predetermined number of times or more in the predetermined period as an address of the data transmission by the transmission unit.

5. The information processing apparatus according to claim 1, wherein, to distinguish the item satisfying the specific condition from the other item, the display control unit is configured to perform highlighting on the item satisfying the specific condition.

6. The information processing apparatus according to claim 5, wherein the highlighting includes enlargement of a display size on the item satisfying the specific condition compared with a display size of the other item.

7. The information processing apparatus according to claim 5, wherein the highlighting includes displaying the item satisfying the specific condition in a display color different from a display color of the other item.

8. The information processing apparatus according to claim 5, wherein the highlighting during scroll display includes stopping and displaying the item satisfying the specific condition at a predetermined position.

9. The information processing apparatus according to claim 6, further comprising a detection unit configured to detect a scroll speed of the plurality of items displayed on the display,
wherein, depending on the scroll speed detected by the detection unit, the display control unit is configured to determine an enlargement rate for displaying, with enlargement, the item satisfying the specific condition.

10. The information processing apparatus according to claim 6, wherein, depending on a number of the items that satisfies the specific condition, the display control unit is configured to determine an enlargement rate for displaying, with enlargement, an item satisfying the specific condition.

11. A control method for controlling an information processing apparatus having a touch panel, the control method comprising:
displaying, on a display, a plurality of items, wherein at least some of the plurality of items include data about a data transmission address; and
causing the plurality of items, displayed on the display, to be scroll-displayed in response to receiving communication regarding a flick operation performed on the touch panel or a drag operation performed on the touch panel,
wherein, in response to receiving communication regarding the flick operation being performed, causing includes causing an item that satisfies a specific condition to be displayed in a form different from that of a displayed other item while the displayed plurality of items is scroll-displayed,
wherein, in response to receiving communication regarding the drag operation being performed, causing includes refraining from causing the item satisfying the specific condition to be displayed in the form different from that of the displayed other item while the displayed plurality of items is scroll-displayed,
wherein the specific condition is that a data transmission address is used a predetermined number of times during a predetermined period, and
wherein, depending on a detected scroll speed, the display causing includes determining an enlargement for displaying the item satisfying the specific condition.

12. A non-transitory computer readable storage medium storing a control program to cause an information processing apparatus having a touch panel to perform a control method, the control method comprising:
displaying, on a display, a plurality of items, wherein at least some of the plurality of items include data about a data transmission address; and
causing the plurality of items, displayed on the display, to be scroll-displayed in response to receiving communication regarding a flick operation performed on the touch panel or a drag operation performed on the touch panel,
wherein, in response to receiving communication regarding the flick operation being performed, causing includes causing an item that satisfies a specific condition to be displayed in a form different from that of a displayed other item while the displayed plurality of items is scroll-displayed,
wherein, in response to receiving communication regarding the drag operation being performed, causing includes refraining from causing the item satisfying the specific condition to be displayed in the form different from that of the displayed other item while the displayed plurality of items is scroll-displayed,
wherein the specific condition is that a data transmission address is used a predetermined number of times during a predetermined period, and
wherein, depending on a detected scroll speed, the display causing includes determining an enlargement for displaying the item satisfying the specific condition.

13. The information processing apparatus according to claim 1, wherein, in a case where a total number of the plurality of items to be scroll-displayed is less than a predetermined number, the display control unit is configured not to cause the item satisfying the specific condition to be displayed in the form different from that of the other item, even while the displayed plurality of items is scroll-displayed in response to receiving communication regarding the flick operation being performed.

14. The information processing apparatus according to claim 9, wherein, in a case where the scroll speed detected by the detection unit is equal to or faster than a predetermined value, the display control unit is configured to increase the enlargement rate of the item satisfying the specific condition, as compared with a case where the scroll speed is slower than the predetermined value.

15. The information processing apparatus according to claim 6, wherein, depending on whether a plurality of the items that satisfies the specific condition is continuously displayed, the display control unit is configured to determine an enlargement rate for displaying, with enlargement, the item satisfying the specific condition.

16. The information processing apparatus according to claim 15, wherein, in a case where the plurality of items that satisfies the specific condition is continuously displayed, the display control unit is configured to reduce the enlargement rate of the item satisfying the specific condition, as compared with a case where the plurality of items that satisfies the specific condition is not continuously displayed.

17. The information processing apparatus according to claim 1, wherein the display is a means for displaying the plurality of items and the display control unit is a means for causing the plurality of items displayed on the display to be scroll-displayed.

18. The information processing apparatus according to claim 1, wherein, in response to receiving communication regarding the flick operation being performed, the display control unit causes an email address, which is used the predetermined number of times during the predetermined period, to be displayed in a form that is highlighted relative to the displayed other email address while the displayed plurality of email addresses is scroll-displayed.

19. The information processing apparatus according to claim 18, wherein the display control unit causes the email address to be displayed in a form that is highlighted relative to the displayed other email address by at least one of enlarging the email address or changing display color of the email address relative to the displayed other email address.

20. The information processing apparatus according to claim 1, wherein the drag operation differs from the flick operation in at least one of predetermined scroll distance or predetermined scroll speed.

21. The information processing apparatus according to claim 1, wherein the specific condition further is that the item is content desired by a user who performs a flick operation on the touch panel or a drag operation on the touch panel.

* * * * *